US012577026B2

(12) United States Patent
Perera et al.

(10) Patent No.: US 12,577,026 B2
(45) Date of Patent: Mar. 17, 2026

(54) ABRASION RESISTANT HEAT SHRINKABLE MULTILAYER FILM

(71) Applicant: Cryovac, LLC, Charlotte, NC (US)

(72) Inventors: Prasanna U. Perera, Spartanburg, SC (US); Sonola Onasanya, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 1204 days.

(21) Appl. No.: 17/433,362

(22) PCT Filed: Feb. 18, 2020

(86) PCT No.: PCT/US2020/018549
§ 371 (c)(1),
(2) Date: Aug. 24, 2021

(87) PCT Pub. No.: WO2020/176282
PCT Pub. Date: Sep. 3, 2020

(65) Prior Publication Data
US 2022/0144521 A1      May 12, 2022

Related U.S. Application Data

(60) Provisional application No. 62/809,931, filed on Feb. 25, 2019.

(51) Int. Cl.
*B32B 27/30*          (2006.01)
*B32B 27/08*          (2006.01)
(Continued)

(52) U.S. Cl.
CPC ............ *B65D 75/004* (2013.01); *B32B 27/08* (2013.01); *B32B 27/306* (2013.01);
(Continued)

(58) Field of Classification Search
CPC ... B32B 27/32; B32B 27/306; B32B 2439/70; B32B 2307/584; B32B 2307/724;
(Continued)

(56) References Cited

U.S. PATENT DOCUMENTS 3,456,044 A       7/1969  Pahlke
4,551,380 A  *  11/1985  Schoenberg ............ B32B 27/32
                                              264/209.6
(Continued)

FOREIGN PATENT DOCUMENTS

WO          2007075473 A1      7/2007
WO          2009049418 A1      4/2009
(Continued)

OTHER PUBLICATIONS https://www.astm.org/d3985-17.html (Year: 2025).*
https://en.wikipedia.org/wiki/Standard_temperature_and_pressure (Year: 2025).*

*Primary Examiner* — Michael C. Romanowski
(74) *Attorney, Agent, or Firm* — Jason R. Womer

(57)      ABSTRACT

A multilayer heat-shrinkable film having a sealant layer and skin layer each including a linear low density polyethylene copolymer and a silicon dioxide, at least two substrate layers including an ethylene copolymer; and a core layer including a very low density polyethylene copolymer.

13 Claims, 1 Drawing Sheet

(51) Int. Cl.
    B32B 27/32          (2006.01)
    B65D 75/00          (2006.01)
    C08K 3/36           (2006.01)

(52) U.S. Cl.
    CPC .............. B32B 27/327 (2013.01); C08K 3/36
        (2013.01); B32B 2250/05 (2013.01); **B32B
        2250/246 (2013.01); B32B 2250/40** (2013.01);
            B32B 2264/102 (2013.01); B32B 2307/308
        (2013.01); B32B 2307/31 (2013.01); **B32B
            2307/406 (2013.01); B32B 2307/584**
        (2013.01); B32B 2307/72 (2013.01); **B32B
            2307/7244 (2013.01); B32B 2307/732**
                (2013.01); B32B 2439/70 (2013.01)

(58) Field of Classification Search
    CPC .... B32B 2307/7242; B32B 2307/7244; B32B
                2307/736; B32B 2307/31; B32B
                2264/1021; B32B 2264/1026; B32B
                2264/107; B32B 2323/00–046; B32B
                7/028; B32B 27/18; B65D 2565/387;
                                B65D 2565/388
    See application file for complete search history.

(56)                    References Cited

U.S. PATENT DOCUMENTS

| | | | |
|---|---|---|---|
| 4,863,769 | A | 9/1989 | Lustig et al. |
| 5,491,019 | A * | 2/1996 | Kuo ........................ B65B 9/213 |
| | | | 428/910 |
| 6,410,136 | B1 * | 6/2002 | DeMeuse ................... C08J 5/18 |
| | | | 428/347 |
| 8,409,697 | B2 | 4/2013 | Ramli et al. |
| 2015/0343748 | A1 * | 12/2015 | Broyles ................... A61L 15/26 |
| | | | 428/339 |
| 2016/0000615 | A1 | 1/2016 | Larios et al. |
| 2018/0001609 | A1 * | 1/2018 | Rivett ................... B32B 27/325 |
| 2018/0215127 | A1 | 8/2018 | Mitchell et al. |
| 2018/0244433 | A1 | 8/2018 | Borchardt et al. |

FOREIGN PATENT DOCUMENTS

| | | | | |
|---|---|---|---|---|
| WO | WO-2012085240 A1 * | 6/2012 | ............. | B32B 27/08 |
| WO | WO-2017207662 A1 * | 12/2017 | ............. | B29C 39/12 |

* cited by examiner

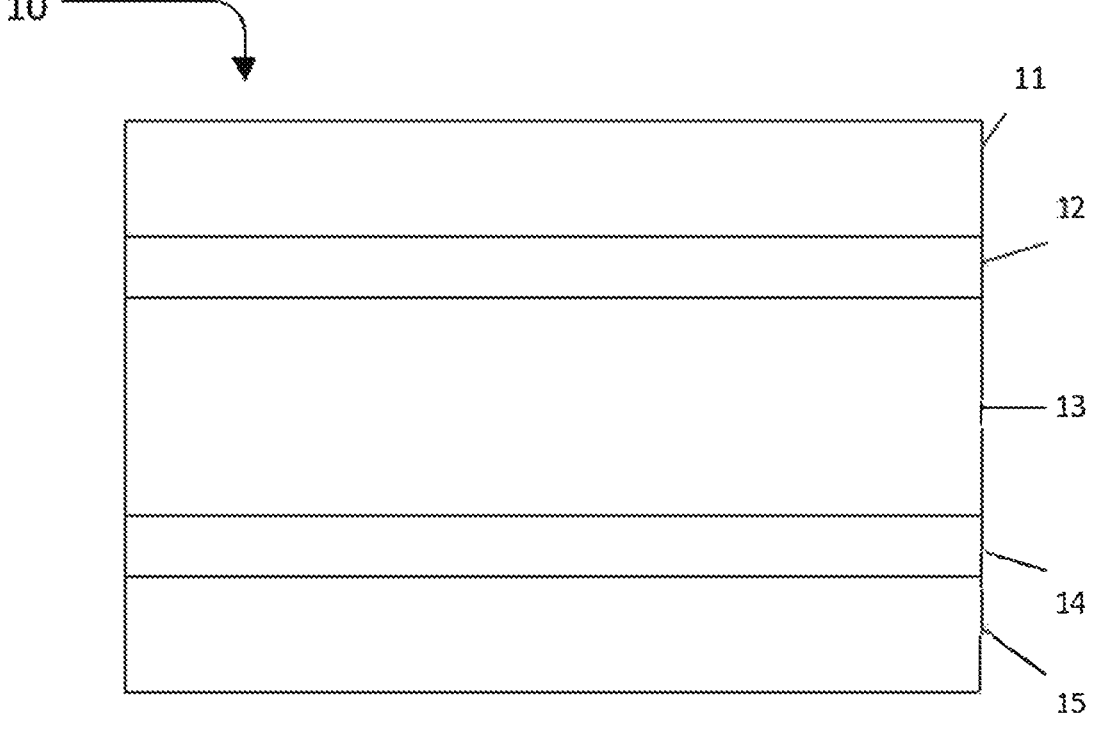

ABRASION RESISTANT HEAT SHRINKABLE MULTILAYER FILM

BACKGROUND

The subject matter disclosed herein relates to flexible films and processes for making flexible films. More particularly to heat shrinkable films for packaging.

Packaged products, such as food products, are often packaged in a ridged, or semi-rigid tray and over-wrapped with a flexible film. Flexible films can be shrunk to improve seal quality and appearance.

Heat-shrinkable packaging films are used for the packaging of a variety of products. Foods, such as meat, can be packaged in such packaging articles. Improved abrasion resistance is particularly important for the packaging of food products, as leaking packages are less desirable to consumers and retailers alike. Film failures, such as punctures or abrasions, can impact the integrity of the packaged product. Moreover, leaking packages reduce shelf life by allowing atmospheric oxygen and microbes to enter the package. During transportation, vibration and friction between tray-to-tray and tray-to-package contact points can cause the film to develop abrasions that may result in holes, splits or leaks in the packaging.

It would be desirable to have a flexible film which is more resistant to failures from abrasion.

The discussion above is merely provided for general background information and is not intended to be used as an aid in determining the scope of the claimed subject matter.

BRIEF DESCRIPTION

A multilayer heat-shrinkable film having a sealant layer and skin layer each including a linear low density polyethylene copolymer and a silicon dioxide, at least two substrate layers including an ethylene copolymer; and a core layer including a very low density polyethylene copolymer.

An advantage that may be realized in the practice of some disclosed embodiments of the film is that additional abrasion resistance can be achieved at the same of thinner film thickness.

In one exemplary embodiment, a multilayer heat-shrinkable film is disclosed. The multilayer heat-shrinkable film having:

a. a sealant layer comprising at least 20 wt % of a homogenous polyethylene copolymer having a density from 0.91 to 0.93 g/cm³ and between 0.01-0.4% of a silicon dioxide;

b. at least two substrate layers comprising an ethylene/vinyl acetate copolymer;

c. a core layer comprising a very low density polyethylene copolymer, a linear low density polyethylene, or blend thereof, and d. a skin layer comprising less than 85 wt % of a homogenous ethylene/hexene copolymer having a density from 0.91 to 0.93 g/cm³ and between 0.01-0.4% of a silicon dioxide;

wherein the multilayer heat-shrinkable film has an oxygen transmission rate of between 2000 to 9000 cm3 (STP)/(m2-day-1 atm) at 40° C. and 0% relative humidity.

In another exemplary embodiment the sealant layer and the skin layer each have between 30-50 wt % ethylene/hexene copolymer having a density from 0.91 to 0.93 g/cm3 and between 50-70 wt % ethylene/octene copolymer having a density from 0.93 to 0.95 g/cm3; and the core layer has between 70-90 wt % ethylene/octene copolymer having a density from 0.93 to 0.95 g/cm3 between 10-30 wt % of a very low density ethylene/octene copolymer having a density less than 0.915 g/cm3.

In another exemplary embodiment the sealant layer has at least 90% ethylene/hexene copolymer having a density from 0.91 to 0.93 g/cm³; the core layer has at least 90 wt % of a very low density ethylene/octene copolymer having a density less than 0.915 g/cm³; and the skin layer has between 70-85 wt % ethylene/hexene copolymer having a density from 0.91 to 0.93 g/cm³ and between 10-20 wt % of a high density polyethylene homopolymer having a density of at least 0.95 g/cm³.

In another exemplary embodiment the multilayer heat-shrinkable film has an oxygen transmission rate of between 4000 to 6000 cm3 (STP)/(m2-day-1 atm) at 40° C. and 0% relative humidity.

In another exemplary embodiment the silicon dioxide of at least one layer is selected from the group consisting of natural silica, talc, synthetic silica, ceramic spheres, diatomaceous earth, kaolin/clay and mica.

In another exemplary embodiment the silicon dioxide of at least one layer is diatomaceous earth.

In another exemplary embodiment the core layer is positioned between the at least two substrate layers.

In another exemplary embodiment the multilayer heat-shrinkable film has a total thickness of between 0.0101-0.0304 mm.

In another exemplary embodiment the multilayer heat-shrinkable film has a total thickness of between 0.0127-0.0254 mm.

In another exemplary embodiment the multilayer heat-shrinkable film has a total thickness of between 0.0139-0.0190 mm.

In another exemplary embodiment the multilayer heat-shrinkable film has a total thickness of less than 0.0190 mm.

In another exemplary embodiment the sealant layer has a thickness of between 15-45% of the total thickness of the multilayer heat-shrinkable film.

In another exemplary embodiment the sealant layer has a thickness of between 25-30% of the total thickness of the multilayer heat-shrinkable film.

In another exemplary embodiment the skin layer has a thickness of between 15-40% of the total thickness of the multilayer heat-shrinkable film.

In another exemplary embodiment the skin layer has a thickness of between 25-30% of the total thickness of the multilayer heat-shrinkable film.

In another exemplary embodiment the core layer has a thickness of between 20-45% of the total thickness of the multilayer heat-shrinkable film.

In another exemplary embodiment the core layer has a thickness of between 30-35% of the total thickness of the multilayer heat-shrinkable film.

In another exemplary embodiment each of the at least two substrate layers have a thickness of between 5-15% of the total thickness of the multilayer heat-shrinkable film.

In another exemplary embodiment each of the at least two substrate layers have a thickness of between 6-8% of the total thickness of the multilayer heat-shrinkable film.

In another exemplary embodiment the preceding claims wherein the multilayer heat-shrinkable film is a five layer heat-shrinkable film, each of the five layers being distinct from an adjacent layer.

In another exemplary embodiment the ethylene/hexene copolymer of the sealant layer is a linear low density ethylene/hexene copolymer In another exemplary embodiment the sealant layer comprises at least 90% linear low density ethylene/hexene copolymer.

In another exemplary embodiment the sealant layer comprises at least 99% linear low density ethylene/hexene copolymer.

In another exemplary embodiment the sealant layer comprises 0.05-0.1 wt % of a silicon dioxide.

In another exemplary embodiment the at least two substrate layers comprise at least 90% of an ethylene/vinyl acetate copolymer.

In another exemplary embodiment the at least two substrate layers comprise at least 99% of an ethylene/vinyl acetate copolymer.

In another exemplary embodiment the very low density ethylene/octene copolymer has an octane content of from 10.5-12.5 wt %.

In another exemplary embodiment the multilayer heat-shrinkable film is cross linked.

In another exemplary embodiment the multilayer heat-shrinkable film is biaxially oriented.

In another exemplary embodiment the multilayer heat-shrinkable film haze a haze of less than 2%.

In another exemplary embodiment, a packaged product is disclosed. The packaged product having:

a. a support structure sufficient to retain its shape while supporting a product;
  b. a product situated within the support;
  c. a multilayer heat-shrinkable film encapsulating the support thereby isolating the product from the external environment;
  the multilayer heat shrinkable film comprising:
    i. a sealant layer comprising at least 20 wt % of a homogenous ethylene/hexene copolymer having a density from 0.91 to 0.93 $g/cm^3$ and between 0.01-0.4% of a silicon dioxide;
    ii. at least two substrate layers comprising an ethylene/vinyl acetate copolymer;
    iii. a core layer comprising a very low density polyethylene copolymer, a linear low density polyethylene, or blend thereof; and
    iv. a skin layer comprising less than 85 wt % of a homogenous ethylene/hexene copolymer having a density from 0.91 to 0.93 $g/cm^3$ and between 0.01-0.4% of a silicon dioxide;
    wherein the multilayer heat-shrinkable film has an oxygen transmission rate of between 2000 to 9000 cm3 (STP)/(m2-day-1 atm) at 40° C. and 0% relative humidity.

In another exemplary embodiment, the packaged product includes a sealant layer and the a layer each comprise between 30-50 wt % ethylene/hexene copolymer having a density from 0.91 to 0.93 $g/cm^3$ and between 50-70 wt % ethylene/octene copolymer having a density from 0.93 to 0.95 $g/cm^3$; and a core layer comprises between 70-90 wt % ethylene/octene copolymer having a density from 0.93 to 0.95 $g/cm^3$ between 10-30 wt % of a very low density ethylene/octene copolymer having a density less than 0.915 $g/cm^3$.

In another exemplary embodiment, the packaged product includes a sealant layer comprises at least 90% ethylene/hexene copolymer having a density from 0.91 to 0.93 $g/cm^3$; a core layer comprises at least 90 wt % of a very low density ethylene/octene copolymer having a density less than 0.915 $g/cm^3$; and a skin layer comprises between 70-85 wt % ethylene/hexene copolymer having a density from 0.91 to 0.93 $g/cm^3$ and between 10-20 wt % of a high density polyethylene homopolymer having a density of at least 0.95 $g/cm^3$.

In another exemplary embodiment the packaged product is a food product.

In another exemplary embodiment the support structure is a thermoformed tray comprising polyethylene terephthalate, crystallized polyethylene terephthalate, amorphous polyethylene terephthalate, recycled polyethylene terephthalate, glycol modified polyethylene terephthalate and blends thereof.

In another exemplary embodiment, a method of packaging a product is disclosed. The method comprises the steps of:

a. providing a support structure sufficient to retain its shape while supporting a product;
  b. situating a product within the support;
  c. encapsulating the support with a multilayer heat-shrinkable film thereby isolating the product from the external environment;
  the multilayer heat shrinkable film comprising:
    i. a sealant layer comprising at least 20 wt % of a homogenous ethylene/hexene copolymer having a density from 0.91 to 0.93 $g/cm^3$ and between 0.01-0.4% of a silicon dioxide;
    ii. at least two substrate layers comprising an ethylene/vinyl acetate copolymer;
    iii. a core layer comprising a very low density polyethylene copolymer, a linear low density polyethylene, or blend thereof; and
    iv. a skin layer comprising less than 85 wt % of a homogenous ethylene/hexene copolymer having a density from 0.91 to 0.93 $g/cm^3$ and between 0.01-0.4% of a silicon dioxide;
    wherein the multilayer heat-shrinkable film has an oxygen transmission rate of between 2000 to 9000 cm3 (STP)/(m2-day-1 atm) at 40° C. and 0% relative humidity.

In another exemplary embodiment the sealant layer and the skin layer each comprise between 30-50 wt % ethylene/hexene copolymer having a density from 0.91 to 0.93 $g/cm^3$ and between 50-70 wt % ethylene/octene copolymer having a density from 0.93 to 0.95 $g/cm^3$; and the core layer comprises between 70-90 wt % ethylene/octene copolymer having a density from 0.93 to 0.95 $g/cm^3$ between 10-30 wt % of a very low density ethylene/octene copolymer having a density less than 0.915 $g/cm^3$.

In another exemplary embodiment the sealant layer comprises at least 90% ethylene/hexene copolymer having a density from 0.91 to 0.93 $g/cm^3$; the core layer comprises at least 90 wt % of a very low density ethylene/octene copolymer having a density less than 0.915 $g/cm^3$; and the skin layer comprises between 70-85 wt % ethylene/hexene copolymer having a density from 0.91 to 0.93 $g/cm^3$ and between 10-20 wt % of a high density polyethylene homopolymer having a density of at least 0.95 $g/cm^3$.

This brief description is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features described herein can be understood, a detailed description may be had by reference to certain embodiments, some of which are illustrated in the accompanying drawings. It is to be noted, however, that the drawings illustrate only certain embodiments and are therefore not to be considered limiting of its scope, for the scope of the invention encompasses other equally effective embodiments. The drawings are not necessarily to scale, emphasis generally being placed upon illustrating the features of certain embodiments. In the drawings, like numerals are used to indicate like parts throughout the various views. Thus, for further understanding of the invention, reference can be made to the following detailed description, read in connection with the drawings in which:

The FIGURE is a multilayer film structure according to an embodiment.

DETAILED DESCRIPTION

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

As used herein, the term "film" is inclusive of plastic web, regardless of whether it is film, bag or sheet. Multi-layer films as disclosed herein may have a total thickness of up to 0.03 mm.

As used herein, the term "package" is inclusive of packages made from such containers by placing a product in the container and sealing the container so that the product is substantially surrounded by the heat-shrinkable multilayer film from which the packaging container is made.

As used herein, the term "bag" is inclusive of L-seal bags, side-seal bags, backseamed bags, and pouches. An L-seal bag has an open top, a bottom seal, one side-seal along a first side edge, and a seamless (i.e., folded, unsealed) second side edge. A side-seal bag has an open top, a seamless bottom edge, with each of its two side edges having a seal therealong. Although seals along the side and/or bottom edges can be at the very edge itself, (i.e., seals of a type commonly referred to as "trim seals"), preferably the seals are spaced inward (preferably 6 to 13 mm, more or less) from the bag side edges, and preferably are made using an impulse-type heat sealing apparatus, which utilizes a bar which is quickly heated and then quickly cooled. A backseamed bag is a bag having an open top, a seal running the length of the bag in which the bag film is either fin-sealed or lap-sealed, two seamless side edges, and a bottom seal along a bottom edge of the bag. A pouch is made from two films sealed together along the bottom and along each side edge, resulting in a U-seal pattern.

As used herein, the phrases "sealant layer" and "food contact layer" may be used interchangeably and refer to a film layer having only one of its surfaces directly adhered to another layer of the film and its other surface is exposed to or in contact with a packaged product.

As used herein, the phrase "substrate layer" refers to a film layer having both its surfaces directly adhered to another layer of the film and having the primary purpose of adhering two layers to one another. The substrate layer further provides puncture, abuse and abrasion resistant and improves the overall mechanical strength of the film.

As used herein, the phrase "core layer" refers to a film layer having both its surfaces directly adhered to another layer of the film. The core layer has a primary function other than serving as an adhesive or compatibilizer for adhering two layers to one another. The core layer provides shrinkability to the film structure. The core layer further provides puncture, abuse and abrasion resistant and improves the overall mechanical strength and machinability of the film.

As used herein, the phrase "skin layer" refers to a film layer having only one of its surfaces directly adhered to another layer of the film and its other surface is exposed to the environment. The primary function of the skin layer is to provide puncture, abuse and abrasion resistance.

As used herein, the term "oriented" refers to a thermoplastic web which forms a film structure in which the web has been elongated in either one direction ("uniaxial") or two directions ("biaxial") at elevated temperatures followed by being set in the elongated configuration by cooling the material while substantially retaining the elongated dimensions. This combination of elongation at elevated temperatures followed by cooling causes an alignment of the polymer chains to a more parallel configuration, thereby improving the mechanical properties of the polymer web. Upon subsequently heating of certain unrestrained, unannealed, oriented sheet of polymer to its orientation temperature, heat shrinkage may be produced.

As used herein, the term "polymer" refers to the product of a polymerization reaction, and is inclusive of homopolymers, copolymers, terpolymers, etc. In general, the layers of a film or film substrate can consist essentially of a single polymer, or can have still additional polymers blended together therewith.

As used herein, terms such as "polyolefin" and "polyester" are inclusive of homopolymers of the genus, copolymers of the genus, terpolymers of the genus, etc, as well as graft polymers of the genus and substituted polymers of the genus (e.g., polymers of the genus having substituent groups thereon).

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages. Heterogeneous copolymers have a molecular weight distribution (Mw/Mn) of greater than 3.0.

As used herein, the phrase "homogeneous polymer" refers to polymerization reaction products of relatively narrow molecular weight distribution and relatively narrow composition distribution. Homogeneous polymers are useful in various layers of the multilayer heat-shrinkable film. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

Homogeneous polymers have a molecular weight distribution (Mw/Mn) of less than 3.0

As used herein, the term "copolymer" refers to polymers formed by the polymerization of reaction of at least two different monomers. For example, the term "copolymer" includes the co-polymerization reaction product of ethylene and an -olefin, such as 1-hexene. The term "copolymer" is also inclusive of, for example, the co-polymerization of a mixture of ethylene, propylene, 1-propene, 1-butene, 1-hexene, and 1-octene. As used herein, a copolymer identified in terms of a plurality of monomers, e.g., "propylene/ethylene copolymer," refers to a copolymer in which either a monomer may copolymerize in a higher weight or molar percent than the other monomer or monomers. However, the first listed monomer generally polymerizes in a higher weight percent than the second listed monomer.

As used herein, the phrase "ethylene/alpha-olefin copolymer" refers to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers. These materials generally include copolymers of ethylene with one or more comonomers selected from C4 to C10 alpha-olefins such as butene-1, hexene-1, octane-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/alpha-olefin copolymers, such as the long chain branched homogeneous ethylene/alpha-olefin copolymers, are another type of ethylene/alpha-olefin copolymer.

"High density polyethylene" (HDPE) as used herein has a density of at least 0.950 grams per cubic centimeter.

"Medium density polyethylene" (MDPE) as used herein has a density in the range of from 0.930 to 0.950 grams per cubic centimeter.

"Low density polyethylene" (LDPE) as used herein has a density in the range of from 0.910 to 0.930 grams per cubic centimeter.

"Linear low density polyethylene" (LLDPE) as used herein has a density in the range of from 0.910 to 0.930 grams per cubic centimeter.

"Very low density polyethylene" VLDPE) as used herein has a density less than 0.915 grams per cubic centimeter.

As used herein, the term "oxygen transmission rate" refers to the oxygen transmitted through a film in accordance with ASTM D3985 "Standard Test Method for Oxygen Gas Transmission Rate Through Plastic Film and Sheeting Using a Coulometric Sensor," which is hereby incorporated, in its entirety, by reference thereto.

As used herein, the term "density" refers to the density of a film in accordance with ASTM 792 "Standard Test Methods for Density and Specific Gravity (Relative Density) of Plastics by Displacement," which is hereby incorporated, in its entirety, by reference thereto.

In an embodiment the multi-layer film is a heat-shrinkable biaxial orientated film. As used herein, the phrase "heat-shrinkable" is used with reference to films which exhibit a total free shrink (i.e., the sum of the free shrink in both the machine and transverse directions) of at least 10% at 185° F., as measured by ASTM D2732, which is hereby incorporated, in its entirety, by reference thereto. All films exhibiting a total free shrink of less than 10% at 185° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D2732. Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

Film transparency (also referred to herein as film clarity) was measured in accordance with ASTM D1746 "Standard Test Method for Transparency of Plastic Sheeting," which is hereby incorporated, in its entirety, by reference thereto. The results are reported herein as "percent transparency." The multilayer, heat-shrinkable film can exhibit a transparency of at least 30 percent, or at least 50 percent, or at least 60 percent, or at least 65 percent, measured using ASTM D1746.

Film haze values were measured in accordance with ASTM D1003 "Standard Test Method for Haze and Luminous Transmittance of Transparent Plastics," which is hereby incorporated, in its entirety, by reference thereto. The results are reported herein as "percent haze." The multilayer, heat-shrinkable film can exhibit a haze of less than 7.5 percent, or less than 5 percent, or less than 3 percent, or less than 2 percent measured using ASTM D1003.

Film gloss values were measured in accordance with ASTM D2457 "Standard Test Method for Specular Gloss of Plastic Films and Solid Plastics," which is hereby incorporated, in its entirety, by reference thereto. The results are reported herein as "percent gloss." The film can exhibit a gloss, as measured using ASTM D 2457, of from 60% to 100%, or from 70% to 90%.

In one embodiment, the film does not comprise a crosslinked polymer network. In another embodiment, the film comprises a crosslinked polymer network. Optionally, the film can be irradiated to induce crosslinking of polymer, particularly polyolefin in the film. The film can be subjected to irradiation using an energetic radiation treatment, such as corona discharge, plasma, flame, ultraviolet, X-ray, gamma ray, beta ray, and high energy electron treatment, which induce cross-linking between molecules of the irradiated material.

Radiation dosages are referred to herein in terms of the radiation unit "RAD," with one million RADS, also known as a megarad, being designated as "MR," or, in terms of the radiation unit kiloGray (kGy), with 10 kiloGray representing 1 MR, as is known to those of skill in the art. A suitable radiation dosage of high energy electrons is in the range of up to 16 to 166 kGy, more preferably 30 to 90 kGy, and still more preferably, 30 to 50 kGy. Preferably, irradiation is carried out by an electron accelerator and the dosage level is determined by standard dosimetry processes. Other accelerators such as a van der Graaf or resonating transformer may be used. The radiation is not limited to electrons from an accelerator since any ionizing radiation may be used.

One or more of the layers of the film may contain one or more additives conventionally used in the manufacture of heat-shrinkable films. Examples of such additives are anti-fogs, pigments, lubricants, anti-oxidants, radical scavengers, UV absorbers, thermal stabilizers, anti-blocking agents, surface active agents, slip aids, optical brighteners, gloss improvers and viscosity modifiers.

Referring to the FIGURE there is shown a multi-layer film 10 according to one embodiment. The multi-layer film 10 includes a sealant layer 11 which seals the film to itself or another article. The sealant layer is exposed to, or is in direct contact with a packaged product. The first substrate layer 12 adheres the sealant layer 11 to the core layer 13. The first substrate layer 12 further provides puncture, abuse and abrasion resistant to the film. The core layer 13 is adheres to the first substrate layer 12 and the second substrate layer 14. The core layer 13 provides puncture, abuse and abrasion resistant and improves the overall mechanical strength and machinability of the film. The second substrate layer 14 adheres the core layer 13 to the skin layer 15. The skin layer 15 forms the outermost layer and provides abuse resistance to the multi-layer film. While a five-layer film is depicted, is understood that additional layers could be incorporated into the multi-layer film in alternative embodiments.

The sealant layer serves to adheres the multi-layer film to itself or to another packaging article. The sealant layer further serves as the packaged product contact layer. In an embodiment, the packaged product is a food product.

In an embodiment, the sealant layer is composed of at least 50 wt % of a linear low density polyethylene. In an embodiment, the sealant layer is composed of at least 75 wt % of a linear low density polyethylene. In an embodiment, the sealant layer is composed of at least 99 wt % of a linear low density polyethylene. In an embodiment, the sealant layer further composes of between 0.05-0.4 wt % of a silicon dioxide. In an embodiment, the sealant layer further composes of between 0.05-0.2 wt % of a silicon dioxide. In an embodiment, the sealant layer further composes of between 0.05-0.1 wt % of a silicon dioxide The silicon dioxide is selected from natural silica, talc, synthetic silica, ceramic spheres, diatomaceous earth, kaolin/clay and mica.

In one embodiment, the linear low density polyethylene is an ethylene/hexene copolymer. In an embodiment, the density of the ethylene/hexene copolymer is between 0.910-0.915 g/cc³. In an embodiment, the density of the ethylene/hexene copolymer is less than 0.915 g/cc³.

It is contemplated that the sealant layer is composed of a blend of a linear low density polyethylene and a medium density polyethylene. In an embodiment, the blend includes at least 50 wt % medium density polyethylene. In an embodiment, the blend includes between 50-70 wt % medium density polyethylene. The medium density polyethylene may be a linear medium density polyethylene. In an embodiment, the medium density polyethylene is an ethylene/octene copolymer having a density of between 0.93-0.94 g/cc³. The octene content of the ethylene/octene copolymer is between 1-5 wt %. In an embodiment, the octene content of the ethylene/octene copolymer is between 2-3 wt %. In an embodiment, the blend of the sealant layer further composes of between 0.05-0.4 wt % of a silicon dioxide. In an embodiment, the blend of the sealant layer further composes of between 0.05-0.2 wt % of a silicon dioxide. In an embodiment, the blend of the sealant layer further composes of between 0.05-0.1 wt % of a silicon dioxide.

The core layer serves to provides shrinkability to the film structure. The core layer further provides puncture, abuse and abrasion resistant and improves the overall mechanical strength and machinability of the film.

In one embodiment, the core layer is composed of at least 50 wt % of a very low density polyethylene. The very low density polyethylene is a linear ethylene/octene copolymer. In an embodiment, the core layer is composed of at least 75 wt % linear ethylene/octene copolymer. The very low density polyethylene is a linear ethylene/octene copolymer. In an embodiment, the core layer is composed of at least 90 wt % linear ethylene/octene copolymer. The very low density polyethylene is a linear ethylene/octene copolymer. In an embodiment, the core layer is composed of at least 99 wt % linear ethylene/octene copolymer. The octene content of the ethylene/octene copolymer is between 8-15 wt %. In an embodiment, the octene content of the ethylene/octene copolymer is between 10-12 wt %. In an embodiment, the density of the linear ethylene/octene copolymer is less than 0.91 g/cc³. In an embodiment, the core layer further comprises less than 2 wt % primary and secondary antioxidant for polymer stabilization. In an embodiment, the core layer further comprises less than 1 wt % primary and secondary antioxidant for polymer stabilization.

In another embodiment, the core layer is composed of a blend of a very low density polyethylene and linear low density polyethylene. The very low density polyethylene is a ethylene/octene copolymer and the linear low density polyethylene is a linear ethylene/octene copolymer. In an embodiment, the core layer is composed of 5-50 wt % very low density polyethylene and 50-90 wt % linear low density polyethylene. In an embodiment, the core layer is composed of 10-30 wt % very low density polyethylene and 60-85 wt % linear low density polyethylene. In an embodiment, the core layer is composed of between 10-30 wt % very low density polyethylene and between 70-90 wt % linear low density polyethylene. In an embodiment, the blend of the core layer further composes of between 0.05-0.4 wt % of a silicon dioxide. In an embodiment, the blend of the core layer further composes of between 0.05-0.2 wt % of a silicon dioxide. In an embodiment, the blend of the core layer further composes of between 0.05-0.1 wt % of a silicon dioxide. In an embodiment, the octene content of the ethylene/octene copolymer is between 8-15 wt %. In an embodiment, the octene content of the ethylene/octene copolymer is between 11-13 wt %. In an embodiment, the octene content of the linear ethylene/octene copolymer is between 1-15 wt %. In an embodiment, the octene content of the linear ethylene/octene copolymer is between 6-7 wt %. In an embodiment, the density of the core layer is less than 0.92 g/cc³.

The skin layer serves to provide abuse resistance to the multi-layer film. In an embodiment the skin layer is composed of a blend of a linear low density polyethylene and a high density polyethylene homopolymer. In an embodiment, the blend includes at between 10-95 wt % linear low density polyethylene and between 5-90 wt % high density polyethylene homopolymer. In an embodiment, the blend includes at between 50-90 wt % linear low density polyethylene and between 10-40 wt % high density polyethylene homopolymer. In an embodiment, the blend includes between 70-90 wt % linear low density polyethylene and between 10-30 wt % high density polyethylene homopolymer. In an embodiment, the blend of the skin layer further composes of between 0.05-0.4 wt % of a silicon dioxide. In an embodiment, the blend of the skin layer further composes of between 0.05-0.2 wt % of a silicon dioxide. In an embodiment, the blend of the skin layer further composes of between 0.05-0.1 wt % of a silicon dioxide.

It is contemplated that other additives may be included in the blend of the skin layer. Such additives include, but are not limited to antifog agents, antiblock agents, natural silica, talc, synthetic silica, ceramic spheres, diatomaceous earth, kaolin/clay, mica, rheology modifiers, extrusion agents and slip agents.

It is contemplated that the skin layer is composed of a blend of a linear low density polyethylene and a medium density polyethylene. In an embodiment, the blend includes at least 50 wt % medium density polyethylene. In an embodiment, the blend includes between 50-70 wt % medium density polyethylene. The medium density polyethylene may be a linear medium density polyethylene. In an embodiment, the medium density polyethylene is an ethylene/octene copolymer. The octene content of the ethylene/octene copolymer is between 1-5 wt %. In an embodiment, the octene content of the ethylene/octene copolymer is between 2-3 wt %. In an embodiment, the blend of the skin layer further composes of between 0.05-2 wt % of a silicon dioxide. In an embodiment, the blend of the skin layer further composes of between 0.05-1 wt % of a silicon dioxide. In an embodiment, the blend of the skin layer further composes of between 0.4-0.6 wt % of a silicon dioxide. In an embodiment, the skin layer has a density of less than 0.93 g/cc³. In an embodiment, the skin layer and sealant layer are of substantially identical compositions and thicknesses.

The substrate layers serve as tie layers to adhere two adjacent layers. The substrate layer further provides puncture, abuse and abrasion resistant and improves the overall mechanical strength of the film. In one embodiment, the substrate layers each directly adhered to the core layer. In an embodiment, one tie layer is directly adhered to a core layer on side and a sealant layer on the other side. In an embodiment, one tie layer is directly adhered to a core layer on side and a skin layer on the other side. In one embodiment, the substrate layers are of substantially identical compositions and thicknesses. In another embodiment, the substrate layers are of distinct compositions, thicknesses or both.

The substrate layer may be a linear low density polyethene copolymer, an ethylene copolymer or blends thereof. In an embodiment, the substrate layers are composed of more than 50% of an ethylene copolymer. In an embodiment, the substrate layers are composed of more than 75% of an ethylene copolymer. In an embodiment, the substrate layers are composed of more than 90% of an ethylene copolymer. In an embodiment, the substrate layers are composed of more than 99.9% of an ethylene copolymer. The ethylene copolymer is ethylene/vinyl acetate copolymer represented by the general formula: [CH3COOCH=CH2]. In an embodiment, the vinyl acetate content is less than 40 wt % of the ethylene/vinyl acetate copolymer. In an embodiment, the vinyl acetate content is less than 30 wt % of the ethylene/vinyl acetate copolymer. In an embodiment, the vinyl acetate content is less than 20 wt % of the ethylene/vinyl acetate copolymer. In an embodiment, the vinyl acetate content is less than 12 wt % of the ethylene/vinyl acetate copolymer. In an embodiment, the vinyl acetate content is less than 9 wt % of the ethylene/vinyl acetate copolymer. In an embodiment, the density of the ethylene/vinyl acetate copolymer is between 0.900-0.960 g/cc³. In an embodiment, the density of the ethylene/vinyl acetate copolymer is between 0.915-0.945 g/cc³. In an embodiment, the density of the ethylene/vinyl acetate copolymer is between 0.925-0.935 g/cc³. In an embodiment, the density of the ethylene/vinyl acetate copolymer is less than 0.94 g/cc³.

In one embodiment the multilayer heat-shrinkable film exhibits an oxygen transmission rate (OTR) ranging from 2000 to 9000, from 3000 to 7000, or from 4000 to 6000 cm³ (STP)/(m²-day-1 atm) at 40° C. and 0% relative humidity. In another embodiment, the multilayer heat-shrinkable film exhibits an OTR ranging from 13,000-20,000, or 15,000-18,000 cm³ (STP)/(m²-day-1 atm) at 22.8° C. and 0% relative humidity. In embodiments, the multilayer heat-shrinkable film exhibits the oxygen transmission rates described herein without perforations in the film.

It is contemplated that the multilayer heat-shrinkable film comprises both symmetrical and asymmetrical layer sequences, with a number of layers from 3 to 9, from 4 to 7 or 5.

In some embodiments, the multilayer heat-shrinkable film has a total thickness from 40 μm to 100 μm, or from 50 μm to 80 μm, or from 60 μm to 70 μm.

The multilayer heat-shrinkable film is oriented in the solid state, and in one embodiment, has been biaxially oriented and can have a free shrink in machine and/or traverse direction of at least 20% in at least one of longitudinal or transversal direction, of at least 25%, or of at least 30% as measured in accordance with ASTM D2732.

The multi-layer film described herein can be made by any suitable means. For example, biaxially orienting films can be made via a double bubble process as described in U.S. Pat. No. 3,456,044 to Pahlke, the contents of which are incorporated herein by reference in their entirety. It is contemplated that the multi-layer film described herein can be manufactured by any suitable process, including but not limited to bubble, double bubble or triple bubble.

In use, the multi-layer film described herein are used for the packaging of products such as food products. A food product is placed within a support structure. The support structure is sufficiently rigid in order to retain its shape while supporting a product and while the support is wrapped. In an embodiment, the support structure is a tray having a cavity for the food product. Food products, include, but are not limited to fish, meat and cheese.

The support structure is a thermoformed tray made from polyethylene terephthalate, crystallized polyethylene terephthalate, amorphous polyethylene terephthalate, recycled polyethylene terephthalate, glycol modified polyethylene terephthalate and blends thereof.

The present invention will now be described in more detail with particular reference to the following Examples.

EXAMPLES

The following Examples provide illustrative embodiments. In light of the present disclosure and the general level of skill in the art, those of ordinary skill in the art will appreciate that the following Examples are intended to be exemplary only and that numerous changes, modifications, and alterations can be employed without departing from the scope of the presently disclosed subject matter.

Control Films

Control Film is a five-layer heat shrinkable film as follows:

(i) A sealant layer composed of 99.5 wt % linear low density ethylene/hexene copolymer and less than 0.5 wt % of a silicon dioxide. The sealant layer making up 17% of the total film thickness.

(ii) A first substrate layer directly adhered to the sealant layer. The first substrate layer composed of 100% ethylene/vinyl acetate copolymer, the vinyl acetate copolymer being in amount of 8.5 wt %. The first substrate layer making up 17% of the total film thickness.

(iii) A core layer directly adhered to the first substrate layer. The core layer being composed 99.2 wt % of a blend of very low density ethylene/hexane copolymer and very low density ethylene/octene copolymer having an octene content of 11.5 wt %. The core being further composed primary and secondary antioxidants. The core layer making up 32% of the total film thickness.

(iv) A second substrate layer directly adhered to the core layer. The second substrate layer composed of 100% ethylene/vinyl acetate copolymer, the vinyl acetate copolymer being in amount of 8.7 wt %. The second substrate layer making up 17% of the total film thickness.

(v) A skin layer composed of 99.5 wt % linear low density ethylene/hexene copolymer and less than 0.5 wt % of a silicon dioxide. The sealant layer making up 17% of the total film thickness.

The total thickness of Control Films being 17.8 (70 gauge) and 20.1 μm (79 gauge).

Film 1

Film 1 is a five-layer heat shrinkable film as follows:

(i) A sealant layer composed of 99.5 wt % linear low density ethylene/hexene copolymer and less than 0.5 wt % of a silicon dioxide. The sealant layer making up 27% of the total film thickness.

(ii) A first substrate layer directly adhered to the sealant layer. The first substrate layer composed of 100% ethylene/vinyl acetate copolymer, the vinyl acetate copolymer being in amount of 8.5 wt %. The first substrate layer making up 7% of the total film thickness.

(iii) A core layer directly adhered to the first substrate layer. The core layer being composed of 99.2 wt % very low density ethylene/octene copolymer having an octene content of 11.5 wt %. The core being further composed of 0.8 wt % linear low density polyethylene. The core layer making up 32% of the total film thickness.

(iv) A second substrate layer directly adhered to the core layer. The second substrate layer composed of 100% ethylene/vinyl acetate copolymer, the vinyl acetate copolymer being in amount of 8.7 wt %. The second substrate layer making up 7% of the total film thickness.

(v) A skin layer having directly adhered to the second substrate layer. The skin layer composed of 80.5 wt % linear low density ethylene/hexene copolymer, 19 wt % high density polyethylene homopolymer and less than 0.1 wt % of a silicon dioxide. The core layer making up 27% of the total film thickness.

The total thickness of Film 1 being 17.8 μm (70 gauge).

Film 2

Film 2 is a five-layer heat shrinkable film as follows:

(i) A sealant layer composed of 40 wt % linear low density ethylene/hexene copolymer, 59.5 wt % medium density linear ethylene/octene copolymer and less than 0.1 wt % of a silicon dioxide. The medium density ethylene/octene copolymer having 2.5% Octene comonomer content. The sealant layer making up 27% of the total film thickness.

(ii) A first substrate layer directly adhered to the sealant layer. The first substrate layer composed of 100% ethylene/vinyl acetate copolymer, the vinyl acetate copolymer being in amount of 8.7 wt %. The first substrate layer making up 7% of the total film thickness.

(iii) A core layer directly adhered to the first substrate layer. The core layer being composed of 79.5 wt % linear low density ethylene/octene copolymer having an octene comonomer content of 6.5 wt %. The core being further composed of 20 wt % very low density ethylene/octene copolymer having an octene content of 12 wt %. The core being further composed of less than 0.1 wt % of a silicon dioxide. The core layer making up 32% of the total film thickness.

(iv) A second substrate layer directly adhered to the core layer. The second substrate layer composed of 100% ethylene/vinyl acetate copolymer, the vinyl acetate copolymer being in amount of 8.7 wt %. The second substrate layer making up 7% of the total film thickness.

(v) A skin layer composed of 40 wt % linear low density ethylene/hexene copolymer, 59.5 wt % medium density linear ethylene/octene copolymer and less than 0.1 wt % of a silicon dioxide. The medium density ethylene/octene copolymer having 2.5% Octene comonomer content. The skin layer making up 27% of the total film thickness.

The total thickness of Film 2 being 17.8 μm (70 gauge).

Film 3

Film 3 is a five-layer heat shrinkable film as follows:

(i) A sealant layer composed of 69.5 wt % linear low density ethylene/hexene copolymer, 30 wt % high density polyethylene homopolymer and less than 0.1 wt % of a silicon dioxide. The sealant layer making up 27% of the total film thickness.

(ii) A first substrate layer directly adhered to the sealant layer. The first substrate layer composed of 100% ethylene/vinyl acetate copolymer, the vinyl acetate copolymer being in amount of 8.5 wt %. The first substrate layer making up 7% of the total film thickness.

(iii) A core layer directly adhered to the first substrate layer. The core layer being composed of 99.2 wt % very low density ethylene/octene copolymer having an octene content of 11.5 wt %. The core being further composed of 0.8 wt % linear low density polyethylene. The core layer making up 32% of the total film thickness.

(iv) A second substrate layer directly adhered to the core layer. The second substrate layer composed of 100% ethylene/vinyl acetate copolymer, the vinyl acetate copolymer being in amount of 8.7 wt %. The second substrate layer making up 7% of the total film thickness.

(v) A skin layer having directly adhered to the second substrate layer. The skin layer composed of 69.5 wt % linear low density ethylene/hexene copolymer, 30 wt % high density polyethylene homopolymer and less than 0.1 wt % of a silicon dioxide. The skin layer making up 27% of the total film thickness.

The total thickness of Film 3 being 17.8 μm (70 gauge).

Film 4

Film 4 is a five-layer heat shrinkable film as follows:

(i) A sealant layer composed of 89.5 wt % linear low density ethylene/hexene copolymer, 10 wt % high density polyethylene homopolymer and less than 0.1 wt % of a silicon dioxide. The sealant layer making up 27% of the total film thickness.

(ii) A first substrate layer directly adhered to the sealant layer. The first substrate layer composed of 100% ethylene/vinyl acetate copolymer, the vinyl acetate copolymer being in amount of 8.5 wt %. The first substrate layer making up 7% of the total film thickness.

(iii) A core layer directly adhered to the first substrate layer. The core layer being composed of 99.2 wt % very low density ethylene/octene copolymer having an octene content of 11.5 wt %. The core being further composed of 0.8 wt % linear low density polyethylene. The core layer making up 32% of the total film thickness.

(iv) A second substrate layer directly adhered to the core layer. The second substrate layer composed of 100% ethylene/vinyl acetate copolymer, the vinyl acetate copolymer being in amount of 8.7 wt %. The second substrate layer making up 7% of the total film thickness.

(v) A skin layer having directly adhered to the second substrate layer. The skin layer composed of 89.5 wt % linear low density ethylene/hexene copolymer, 10 wt % high density polyethylene homopolymer and less than 0.1 wt % of a silicon dioxide. The skin layer making up 27% of the total film thickness.

The total thickness of Film 4 being 17.8 µm (70 gauge).

Film 5

Film 5 is a five-layer heat shrinkable film as follows:

(i) A sealant layer composed of 80.9 wt % linear low density ethylene/hexene copolymer, 19 wt % high density polyethylene homopolymer and less than 0.02 wt % of a silicon dioxide. The sealant layer making up 27% of the total film thickness.

(ii) A first substrate layer directly adhered to the sealant layer. The first substrate layer composed of 100% ethylene/vinyl acetate copolymer, the vinyl acetate copolymer being in amount of 8.5 wt %. The first substrate layer making up 7% of the total film thickness.

(iii) A core layer directly adhered to the first substrate layer. The core layer being composed of 99.2 wt % very low density ethylene/octene copolymer having an octene content of 11.5 wt %. The core being further composed of 0.8 wt % linear low density polyethylene. The core layer making up 32% of the total film thickness.

(iv) A second substrate layer directly adhered to the core layer. The second substrate layer composed of 100% ethylene/vinyl acetate copolymer, the vinyl acetate copolymer being in amount of 8.7 wt %. The second substrate layer making up 7% of the total film thickness.

(v) A skin layer having directly adhered to the second substrate layer. The skin layer composed of 80.9 wt % linear low density ethylene/hexene copolymer, 19 wt % high density polyethylene homopolymer and less than 0.02 wt % of a silicon dioxide. The skin layer making up 27% of the total film thickness.

The total thickness of Film 5 being 17.8 µm (70 gauge).

Film 6

Film 6 is a five-layer heat shrinkable film as follows:

(i) A sealant layer composed of 80 wt % linear low density ethylene/hexene copolymer, 19 wt % high density polyethylene homopolymer and less than 0.2 wt % of a silicon dioxide. The sealant layer making up 27% of the total film thickness.

(ii) A first substrate layer directly adhered to the sealant layer. The first substrate layer composed of 100% ethylene/vinyl acetate copolymer, the vinyl acetate copolymer being in amount of 8.5 wt %. The first substrate layer making up 7% of the total film thickness.

(iii) A core layer directly adhered to the first substrate layer. The core layer being composed of 99.2 wt % very low density ethylene/octene copolymer having an octene content of 11.5 wt %. The core being further composed of 0.8 wt % linear low density polyethylene. The core layer making up 32% of the total film thickness.

(iv) A second substrate layer directly adhered to the core layer. The second substrate layer composed of 100% ethylene/vinyl acetate copolymer, the vinyl acetate copolymer being in amount of 8.7 wt %. The second substrate layer making up 7% of the total film thickness.

(v) A skin layer having directly adhered to the second substrate layer. The skin layer composed of 80 wt % linear low density ethylene/hexene copolymer, 19 wt % high density polyethylene homopolymer and less than 0.2 wt % of a silicon dioxide. The skin layer making up 27% of the total film thickness.

The total thickness of Film 6 being 17.8 µm (70 gauge).

Film 7

Film 7 is a five-layer heat shrinkable film as follows:

(i) A sealant layer composed of 79 wt % linear low density ethylene/hexene copolymer, 19 wt % high density polyethylene homopolymer and less than 0.4 wt % of a silicon dioxide. The sealant layer making up 27% of the total film thickness.

(ii) A first substrate layer directly adhered to the sealant layer. The first substrate layer composed of 100% ethylene/vinyl acetate copolymer, the vinyl acetate copolymer being in amount of 8.5 wt %. The first substrate layer making up 7% of the total film thickness.

(iii) A core layer directly adhered to the first substrate layer. The core layer being composed of 99.2 wt % very low density ethylene/octene copolymer having an octene content of 11.5 wt %. The core being further composed of 0.8 wt % linear low density polyethylene. The core layer making up 32% of the total film thickness.

(iv) A second substrate layer directly adhered to the core layer. The second substrate layer composed of 100% ethylene/vinyl acetate copolymer, the vinyl acetate copolymer being in amount of 8.7 wt %. The second substrate layer making up 7% of the total film thickness.

(v) A skin layer having directly adhered to the second substrate layer. The skin layer composed of 79 wt % linear low density ethylene/hexene copolymer, 19 wt % high density polyethylene homopolymer and less than 0.4 wt % of a silicon dioxide. The skin layer making up 27% of the total film thickness.

The total thickness of Film 7 being 17.8 µm (70 gauge).

Abrasion Testing

Abrasion testing method: Shaker Table Test: Solid trays with dimensions 9"×7"×1.25" were overwrapped with different film variants using an Ossid 500E machine and shrunk on an Ossid 500ESS hot Air Shrink tunnel and a Cryovac Model 3072G waterfall tunnel. In each experiment an equal number of trays for each variant were compared to a control. There are 12 trays per box (1×3, 4 layers high). Standard pallet configuration was 10 boxes per layer, 8 layers high. The pallet was placed on a Lansmont Vibration table and tested under ASTM D4169 Truck Level I. Each individual package was evaluated for defects. Data was statistically analyzed for differences.

TABLE 1

| | % of all side pass Trays | Film gauge |
|---|---|---|
| Control Film | 30.56 | 70 |
| Control Film | 35.83 | 79 |
| Film 1 | 50.8 | 70 |
| Film 2 | 44.17 | 70 |
| Film 3 | N/A | 70 |
| Film 4 | 41.7 | 70 |

As show in Table 1, Films 1, 2 and 4 show improved abrasion resistance as compared to Control Film. Films 1, 2 and 4 exhibit a pass rate of over 40%. Film 1 exhibits a pass rate of over 50%. Film 3 was unable to be processed. The higher level of high density polyethylene homopolymer is suspected to lead to processability issues.

17

TABLE 2

| | % of all side pass Trays | Silicon Dioxide wt % in skin layer |
|---|---|---|
| Film 5 | 17 | 0.02 |
| Film 6 | 50 | 0.2 |
| Film 7 | 58 | 0.4 |

Table 2 shows the effects of silicon dioxide in the skin layer. Further increases silicon dioxide concentration would adversely affect optical qualities of the film.

Optical tests on the films was performed according to the methods described herein and the results reported on Table 3.

TABLE 3

| Formulation | Gloss (%) | Clarity (%) | Haze (%) |
|---|---|---|---|
| Control Film | 88.00 | 67.60 | 1.50 |
| Film 1 | 80.00 | 70.10 | 1.70 |
| Film 2 | 89.00 | 65.00 | 2.00 |

This written description uses examples to disclose the invention to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multilayer heat-shrinkable film comprising:
   a. a sealant layer comprising between 30-49.99 wt % of a homogeneous polyethylene copolymer having a density from 0.91 to 0.93 g/cm$^3$, between 50-69.99 wt % ethylene/octene copolymer having a density from 0.93 to 0.95 g/cm$^3$, and between 0.01-0.4 wt % of a member selected from the group consisting of natural silica, synthetic silica, ceramic spheres, diatomaceous earth, kaolin, and mica;
   b. at least two substrate layers comprising an ethylene/vinyl acetate copolymer;
   c. a core layer comprising between 70-90 wt % ethylene/octene copolymer having a density from 0.93 to 0.95 g/cm$^3$, and between 10-30 wt % of a very low density ethylene/octene copolymer having a density less than 0.915 g/cm$^3$, and
   d. a skin layer comprising between 30-39.99 wt % of a homogeneous ethylene/hexene copolymer having a density from 0.91 to 0.93 g/cm$^3$, at least 10 wt % of a high density polyethylene homopolymer having a density of at least 0.95 g/cm$^3$, and between 50-59.99 wt % ethylene/octene copolymer having a density from 0.93 to 0.95 g/cm$^3$, and between 0.01-0.4 wt % of a member selected from the group consisting of natural silica, synthetic silica, ceramic spheres, diatomaceous earth, kaolin, and mica;
   wherein the multilayer heat-shrinkable film has an oxygen transmission rate of between 2000 to 9000 cm$^3$ (STP)/(m$^2$-day-1 atm) at 40° C. and 0% relative humidity measured in accordance with ASTM D3985.

2. The multilayer heat-shrinkable film of claim 1, wherein the multilayer heat-shrinkable film has a total thickness of between 0.0101-0.0304 mm.

3. The multilayer heat-shrinkable film of claim 1, wherein the sealant layer has a thickness of between 15-45% of the total thickness of the multilayer heat-shrinkable film; the skin layer has a thickness of between 15-40% of the total thickness of the multilayer heat-shrinkable film; the core layer has a thickness of between 20-45% of the total thickness of the multilayer heat-shrinkable film; and each of the at least two substrate layers have a thickness of between 5-15% of the total thickness of the multilayer heat-shrinkable film.

4. The multilayer heat-shrinkable film of claim 1, wherein the multilayer heat-shrinkable film is a five layer heat-shrinkable film, each of the five layers being distinct from an adjacent layer.

5. The multilayer heat-shrinkable film of claim 1, wherein the ethylene/hexene copolymer of the skin layer is a linear low density ethylene/hexene copolymer.

6. The multilayer heat-shrinkable film of claim 1, wherein the multilayer heat-shrinkable film is cross linked and biaxially oriented.

7. The multilayer heat-shrinkable film of claim 1, wherein the multilayer heat-shrinkable film has a haze of less than 2% measured in accordance with ASTM D1003 and has a gloss from 70% to 90% measured in accordance with ASTM D2457.

8. A packaged product comprising:
   a. a support structure exhibiting a shape;
   b. a product situated within the support;
   c. a multilayer heat-shrinkable film encapsulating the support thereby isolating the product from an external environment;
   the multilayer heat-shrinkable film comprising:
      i. a sealant layer comprising between 30-49.99 wt % of a homogeneous polyethylene copolymer having a density from 0.91 to 0.93 g/cm$^3$, between 50-69.99 wt % ethylene/octene copolymer having a density from 0.93 to 0.95 g/cm$^3$, and between 0.01-0.4 wt % of a member selected from the group consisting of natural silica, synthetic silica, ceramic spheres, diatomaceous earth, kaolin, and mica;
      ii. at least two substrate layers comprising an ethylene/vinyl acetate copolymer;
      iii. a core layer comprising between 70-90 wt % ethylene/octene copolymer having a density from 0.93 to 0.95 g/cm$^3$, and between 10-30 wt % of a very low density ethylene/octene copolymer having a density less than 0.915 g/cm$^3$; and
      iv. a skin layer comprising between 30-39.99 wt % of a homogeneous ethylene/hexene copolymer having a density from 0.91 to 0.93 g/cm$^3$, at least 10 wt % of a high density polyethylene homopolymer having a density of at least 0.95 g/cm$^3$, and between 50-59.99 wt % ethylene/octene copolymer having a density from 0.93 to 0.95 g/cm$^3$, and between 0.01-0.4 wt % of a member selected from the group consisting of natural silica, synthetic silica, ceramic spheres, diatomaceous earth, kaolin, and mica;
   wherein the multilayer heat-shrinkable film has an oxygen transmission rate of between 2000 to 9000 cm$^3$ (STP)/(m$^2$-day-1 atm) at 40° C. and 0% relative humidity measured in accordance with ASTM D3985.

9. The packaged product of claim 8 wherein the product is a food product.

10. The packaged product of claim 8 wherein the support structure is a thermoformed tray comprising polyethylene terephthalate, crystallized polyethylene terephthalate, amorphous polyethylene terephthalate, recycled polyethylene terephthalate, glycol modified polyethylene terephthalate and blends thereof.

11. The packaged product of claim 8 wherein the multilayer heat-shrinkable film is not perforated.

12. The packaged product of claim 8 wherein the packaged product has a pass rate of at least 40% Shaker Table Test tested under ASTM D4169 Truck Level I.

13. A method for packaging a product comprising the steps of:

a. providing a support structure which retains its shape while supporting a product;

b. situating a product within the support;

c. encapsulating the support with a multilayer heat-shrinkable film thereby isolating the product from an external environment;

the multilayer heat-shrinkable film comprising:

i. a sealant layer comprising between 30-49.99 wt % of a homogeneous polyethylene copolymer having a density from 0.91 to 0.93 g/cm$^3$, between 50-69.99 wt % ethylene/octene copolymer having a density from 0.93 to 0.95 g/cm$^3$, and between 0.01-0.4 wt % of a member selected from the group consisting of natural silica, synthetic silica, ceramic spheres, diatomaceous earth, kaolin, and mica;

ii. at least two substrate layers comprising an ethylene/vinyl acetate copolymer;

iii. a core layer comprising between 70-90 wt % ethylene/octene copolymer having a density from 0.93 to 0.95 g/cm$^3$, and between 10-30 wt % of a very low density ethylene/octene copolymer having a density less than 0.915 g/cm$^3$, and iv. a skin layer comprising between 30-39.99 wt % of a homogeneous ethylene/hexene copolymer having a density from 0.91 to 0.93 g/cm$^3$, at least 10 wt % of a high density polyethylene homopolymer having a density of at least 0.95 g/cm$^3$, and between 50-59.99 wt % ethylene/octene copolymer having a density from 0.93 to 0.95 g/cm$^3$, and between 0.01-0.4 wt % of a member selected from the group consisting of natural silica, synthetic silica, ceramic spheres, diatomaceous earth, kaolin, and mica;

wherein the multilayer heat-shrinkable film has an oxygen transmission rate of between 2000 to 9000 cm$^3$ (STP)/ (m$^2$-day-1 atm) at 40° C. and 0% relative humidity measured in accordance with ASTM D3985.

\* \* \* \* \*